(12) United States Patent
Okamoto et al.

(10) Patent No.: US 9,318,735 B2
(45) Date of Patent: Apr. 19, 2016

(54) TERMINAL-ATTACHED PLATE, PLATE ASSEMBLY, AND BATTERY MODULE

(75) Inventors: Ryoya Okamoto, Yokkaichi (JP); Hiroomi Hiramitsu, Yokkaichi (JP); Hiroki Hirai, Yokkaichi (JP); Masakuni Kasugai, Osaka (JP); Toshiyuki Motohashi, Funabashi (JP); Yasuhiro Suzuki, Yokohama (JP); Tatsuya Higashino, Yokohama (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); NISSAN MOTOR CO., LTD., Yokohama-shi (JP)

( * ) Notice: Subject to any disclaimer, the term of this patent is extended or adjusted under 35 U.S.C. 154(b) by 458 days.

(21) Appl. No.: 13/878,620

(22) PCT Filed: Nov. 14, 2011

(86) PCT No.: PCT/JP2011/076179
§ 371 (c)(1),
(2), (4) Date: Apr. 17, 2013

(87) PCT Pub. No.: WO2012/077465
PCT Pub. Date: Jun. 14, 2012

(65) Prior Publication Data
US 2013/0196193 A1    Aug. 1, 2013

(30) Foreign Application Priority Data
Dec. 7, 2010 (JP) ................................. 2010-272808

(51) Int. Cl.
*H01M 2/20* (2006.01)
*H01M 2/22* (2006.01)
(Continued)

(52) U.S. Cl.
CPC ............ *H01M 2/305* (2013.01); *H01M 2/1061* (2013.01); *H01M 2/20* (2013.01); *H01M 2/30* (2013.01); *H01M 2010/4271* (2013.01); *H01M 2220/20* (2013.01)

(58) Field of Classification Search
CPC .... H01M 2/1061; H01M 2/266; H01M 2/305
See application file for complete search history.

(56) References Cited

U.S. PATENT DOCUMENTS 1,722,203 A * 7/1929 Day ........................ H01M 2/32
429/65
3,956,576 A * 5/1976 Jensen ................. H01R 11/284
174/138 F
(Continued)

FOREIGN PATENT DOCUMENTS

CN          101202333 A        6/2008
CN          101494300 A        7/2009
(Continued)

OTHER PUBLICATIONS

Dec. 13, 2011 International Search Report issued in Application No. PCT/JP2011/076179 (with English translation).
(Continued)

*Primary Examiner* — Kenneth Douyette
(74) *Attorney, Agent, or Firm* — Oliff PLC

(57) ABSTRACT

To provide a terminal-attached plate, which is capable of providing a connector fitting portion at only one end portion of a battery module, and is capable of preventing the battery module from being made thick, and to provide a plate assembly, and a battery module. A battery module includes a single-cell stack and a plate assembly including stacked plates turned back alternately and connected to an end of the stack, each plate including a joining portion, a plate supporting portion, a terminal including a connecting portion connected to a tab of the battery and a contact portion connected to a connector, and a hood member protecting the contact portion, wherein the hood member is disposed at a position offset to an end portion side of the plate from a center in a longitudinal direction of the plate.

9 Claims, 16 Drawing Sheets

(51) Int. Cl.
  *H01M 2/30* (2006.01)
  *H01M 2/10* (2006.01)
  *H01M 10/42* (2006.01)

(56) References Cited

U.S. PATENT DOCUMENTS

| | | | | |
|---|---|---|---|---|
| 4,778,408 A * | 10/1988 | Morrison | H01R 11/282 | 439/522 |
| 5,576,516 A * | 11/1996 | Kameyama | H01M 2/32 | 174/138 F |
| 5,645,448 A * | 7/1997 | Hill | H01R 13/52 | 439/522 |
| 2002/0060905 A1 | 5/2002 | Yamada et al. | | |
| 2003/0190522 A1* | 10/2003 | Ogata | H01M 6/46 | 429/179 |
| 2005/0079412 A1 | 4/2005 | Kim | | |
| 2005/0089751 A1* | 4/2005 | Oogami | H01M 2/1061 | 429/162 |
| 2008/0138698 A1 | 6/2008 | Ogami et al. | | |
| 2009/0197160 A1* | 8/2009 | Fujiwara | H01M 2/18 | 429/146 |
| 2010/0247996 A1* | 9/2010 | Ijaz | H01M 2/0245 | 429/120 |
| 2012/0115017 A1 | 5/2012 | Hellmann | | |

FOREIGN PATENT DOCUMENTS

| | | |
|---|---|---|
| JP | A-2008-147045 | 6/2008 |
| JP | A-2011-108408 | 6/2011 |
| WO | 2009/023775 A2 | 2/2009 |

OTHER PUBLICATIONS

Dec. 9, 2014 Office Action issued in Chinese Application No. 201180058855.4.

Sep. 22, 2015 Search Report issued in European Patent Application No. 11847616.7.

* cited by examiner

TERMINAL-ATTACHED PLATE, PLATE ASSEMBLY, AND BATTERY MODULE

TECHNICAL FIELD

The present invention relates to a terminal-attached plate, a plate assembly, and a battery module.

BACKGROUND ART

Conventionally, high-power batteries are mounted in electric cars including motors as their driving sources and hybrid cars including motors and engines as their driving sources. Flat thin secondary cells are used for single cells in the high-power batteries. Stacking to electrically connect the single cells in series or in parallel forms a high capacity battery module. Further, combining to electrically connect the battery modules forms an assembled battery, which is mounted in an automobile. Including flat single cells, each battery module can be formed into a compact, high-energy density battery module.

Laminate type batteries are used as the thin single cells, each of which has a configuration that an electric power generation element, which includes a flat positive electrode plate, a flat negative electrode plate and a separator disposed therebetween, is sealed with an exterior package such as a laminated film, where the rim of the battery is thermal welded to seal the electric power generation element and an electrolytic solution therein, and electrode tabs connected to the positive electrode plate and the negative electrode plate are drawn to the outside from end portions of the battery.

The voltage of each laminate type battery in the battery module including the stacked laminate type batteries changes with the condition change of the moving automobile. To keep observing the state of charge and discharge of the laminate type batteries by precisely grasping the voltage of each laminate type battery is important in order to improve the reliability of the automobile. For this purpose, voltage detecting terminals arranged to measure voltage are each provided to the laminate type batteries.

It is known that connector terminals are used to connect the voltage detecting terminals provided to the laminate type batteries with an external device.

It is known that in order to detect the voltage of each of the laminate type batteries in the battery module, instead of connecting voltage detecting harnesses with the electrode tabs of the laminate type batteries, the voltage detecting terminals are firstly connected with the laminate type batteries, connectors with which voltage detecting harnesses are connected are connected with the voltage detecting terminals after the single cells with the voltage detecting terminals are stacked, and then the voltage detecting terminals are connected with the voltage detecting harnesses by one operation (see PTL 1, for example).

CITATION LIST

Patent Literature

PTL 1: JP 2008-147045 A

SUMMARY OF INVENTION

Technical Problem

PTL 1 discloses a battery module 500 including a single-cell stack 510 including eight laminate type batteries 501 to 508, and plate assemblies 521 and 522 disposed at both the end portions in a longitudinal direction of the single-cell stack 510 as shown in FIG. 15. The battery module 500 includes a first connector fitting portion 531 disposed in the center of the plate assembly 521, where voltage detecting terminals of four of the laminate type batteries are integrated, and a hood member 541 that is attached to the first connector fitting portion 531. In addition, the battery module 500 includes a second connector fitting portion 532 disposed in the center of the plate assembly 522, where voltage detecting terminals of the other four laminate type batteries are integrated, and a hood member 542 that is attached to the second connector fitting portion 532.

In the configuration of including the connector fitting portions 531 and 532 at both the end portions in the longitudinal direction of battery module 510, connectors need to be each provided to the connector fitting portions 531 and 532 for each battery module 510. In addition, two times of operation is required to connect these connectors. In addition, having the configuration of including the connector fitting portions 531 and 532 at two sites at both the end portions in the longitudinal direction, the battery module 510 needs to be disposed such that the connectors are connected to both the end portions of the single-cell stack 510, so that there arises a problem that the disposition of the battery module 510 is limited. This problem can be solved if the connector fitting portions are disposed at one end portion of the single-cell stack 510.

The connector fitting portions include the voltage detecting terminals. The conventional voltage detecting terminals are made of busbars each including blade-shaped contact portions. Meanwhile, connectors of wiring harnesses include terminals having female contact portions having a shape to sandwich the blade-shaped contact portions vertically. The applicants of the present application have tried using voltage detecting terminals including contact portions having a shape other than a blade shape, e.g., a pin shape. The terminals including the pin-shaped contact portions (pin terminals) need to be provided with hood members arranged to protect the pin terminals. This is because when single cells each including the pin terminals are stacked during assembling work of a battery, the pin terminals could be bent. Thus, the pin terminals need to be provided with the hood members.

A certain space needs to be provided between each voltage detecting terminal and each hood member in a plate assembly. In the configuration that the hood members are each provided to the contact portions of the voltage detecting terminals, while it is possible to expand the hood members in a longitudinal direction of plates, the hood members interfere with each other when the hood members are expanded in a direction of stacking the plates. Thus, the terminal-attached plates need to be stacked sandwiching spacers therebetween, which have a thickness corresponding to the height of the hood members, to build the plate assembly.

However, the configuration of the plate assembly including the spaces cannot make a battery module thinner. A feature of each laminate type battery is its small thickness, so that the resultant thick battery module reduces the commercial value of the battery module.

The present invention has been made in view of the above circumstances and has an object to overcome the above problem, and to provide a terminal-attached plate, which is capable of providing a connector fitting portion at only one end portion of a battery module, and is capable of preventing the battery module from being made thick, and to provide a plate assembly, and a battery module.

Solution to Problem

To achieve the objects and in accordance with the purpose of the present invention, a terminal-attached plate for use in a plate assembly of a battery module is provided, the battery module including a single-cell stack including thin batteries stacked in a thickness direction, each of which includes a thin-plate-shaped battery body including an electric power generation element sealed with an exterior package, and tabs connected to electrodes of the electric power generation element and drawn to the outside from end portions of the exterior package, and a plate assembly connected to an end portion of the single-cell stack, the plate including a joining portion, with which the plate is arranged to be joined to an end portion of the thin battery, a plate supporting portion arranged to support another plate that is stacked on the plate, a terminal including a connecting portion with which the terminal is arranged to be connected to a tab of the thin battery and a contact portion with which the terminal is arranged to be connected to a connector, and a hood member arranged to protect the contact portion of the terminal, wherein the hood member is disposed at a position that is offset to an end portion side of the plate from a center in a longitudinal direction of the plate, and at least a portion of the hood member overlaps a hood member of another plate in a direction of stacking the plates in the plate assembly.

It is preferable that the offset position at which the hood member of the plate is disposed is adjacent to the offset position at which the hood member of the another plate is disposed when the another plate that is turned back is stacked on the plate.

It is preferable that the terminal-attached plate further including a pair of guide members arranged to guide plates in stacking the plates, each of which has an H-letter shape cross section, and which are disposed at positions opposed to each other sandwiching the hood member.

In another aspect of the present invention, a plate assembly for use in a battery module is provided, the battery module including a single-cell stack including thin batteries stacked in a thickness direction, each of which includes a thin-plate-shaped battery body including an electric power generation element sealed with an exterior package, and tabs connected to electrodes of the electric power generation element and drawn to the outside from end portions of the exterior package, and a plate assembly connected to an end portion of the single-cell stack, the plate assembly including a plurality of stacked plates, each of the plate including, a joining portion, with which the plate is arranged to be joined to an end portion of the thin battery, a plate supporting portion arranged to support another plate that is stacked on the plate, a terminal including a connecting portion with which the terminal is arranged to be connected to a tab of the thin battery and a contact portion with which the terminal is arranged to be connected to a connector, and a hood member arranged to protect the contact portion of the terminal, wherein the hood member is disposed at a position that is offset to an end portion side of the plate from a center in a longitudinal direction of the plate, and at least a portion of the hood member overlaps a hood member of another plate in a direction of stacking the plates in the plate assembly, wherein the plates are stacked while the another plate that is turned back is stacked on the plate.

It is preferable that the offset position at which the hood member of the plate is disposed is adjacent to the offset position at which the hood member of the another plate is disposed when the another plate that is turned back is stacked on the plate.

It is preferable that at least one of the plates defines a guide plate that includes a pair of guide members arranged to guide the plates in stacking the plates, each of which has an H-letter shape cross section, and which are disposed at positions opposed to each other sandwiching the hood member.

Yet, in another aspect of the present invention, a battery module includes a single-cell stack including thin batteries stacked in a thickness direction, each of which includes a thin-plate-shaped battery body including an electric power generation element sealed with an exterior package, and tabs connected to electrodes of the electric power generation element and drawn to the outside from end portions of the exterior package, and a plate assembly connected to an end portion of the single-cell stack, the plate assembly including a plurality of stacked plates, each of the plate including a joining portion, with which the plate is arranged to be joined to an end portion of the thin battery, a plate supporting portion arranged to support another plate that is stacked on the plate a terminal including a connecting portion with which the terminal is arranged to be connected to a tab of the thin battery and a contact portion with which the terminal is arranged to be connected to a connector, and a hood member arranged to protect the contact portion of the terminal, wherein the hood member is disposed at a position that is offset to an end portion side of the plate from a center in a longitudinal direction of the plate, and at least a portion of the hood member overlaps a hood member of another plate in a direction of stacking the plates in the plate assembly, wherein the plates are stacked while the another plate that is turned back is stacked on the plate in the plate assembly, and the plate assembly is disposed at one end portion of single-cell stack.

It is preferable that the offset position at which the hood member of the plate is disposed is adjacent to the offset position at which the hood member of the another plate is disposed when the another plate that is turned back is stacked on the plate in the plate assembly.

It is preferable that at least one of the plates defines a guide plate that includes a pair of guide members arranged to guide the plates in stacking the plates, each of which has an H-letter shape cross section, and which are disposed at positions opposed to each other sandwiching the hood member in the plate assembly.

Advantageous Effects of Invention

Because the terminal-attached plate of the present invention has the configuration that the hood member is disposed at the position that is offset to the end portion side of the plate from the center in the longitudinal direction of the plate, when a plurality of the terminal-attached plates are stacked to form a plate assembly, the terminal-attached plates of the present invention are capable of preventing the vertically adjacent hood members from interfering with each other by being alternately turned back to be stacked. Consequently, even if the hood member has a given shape of which a certain height in a thickness direction is required, the terminal-attached plate of the present invention allows the hood member to have the required height. That is, the terminal-attached plate of the present invention allows the hood member to be compatible with contact portions more various in kind than a conventional hood member. In addition, the terminal-attached plates of the present invention, which are actually of one kind, can be capable of being used as two kinds of plates that include the terminals disposed at different positions in the longitudinal directions by being alternately turned back to be stacked.

In the plate assembly including the terminal-attached plates of the present invention, a connector fitting portion, in which contact portions of terminals of all the single cells are disposed, can be provided to the plate assembly disposed at the one end portion of the battery module. The connector fitting portion of the plate assembly is capable of favorably protecting the contact portions when the connector is fitted into the connector fitting portion because the contact portions of the terminals are protected by the hood members. Thus, the battery module having the configuration that connect functions are integrated in the plate assembly disposed at the one end portion of the battery module can be obtained.

Further, having the configuration that the vertically adjacent hood members in a direction of stacking the plates do not interfere with each other by being alternately turned back to be stacked, the terminal-attached plates of the present invention are capable of preventing the entire battery module from being made thick even if the hood members are made thicker than the plates.

In the configuration that the offset position at which the hood member of the plate is disposed is adjacent to the offset position at which the hood member of the another plate is disposed when the plates are stacked while the another plate is turned back, the hood members are made adjacent to each other in the connector fitting portion. Thus, the size of a connector, which is connected to the connector fitting portion, can be made minimum.

In the plate assembly of the present invention including the terminal-attached plates described above, it is unnecessary to provide a plate having the function of a spacer, which is conventionally necessary, which can reduce the number of components.

In the battery module of the present invention including the plate assembly described above, because the connector fitting portion is disposed at the one end portion of the single-cell stack, one connector suffices while two connectors are conventionally necessary. Thus, the connection to the connector can be made at the one end portion of the single-cell stack, which can produce the effect of less limiting the disposition of the battery modules in using them in combination. In addition, a contact portion such as a pin-shaped contact portion, which cannot be used conventionally unless the battery module is not made thicker, can be used in the battery module of the present invention, so that the thickness of the laminate type battery module needs not to be made larger than necessary, which is an important feature of the laminate type battery. Thus, the battery module of the present invention is compatible with contact portions of terminals of various kinds.

DESCRIPTION OF EMBODIMENTS

Figure 1:
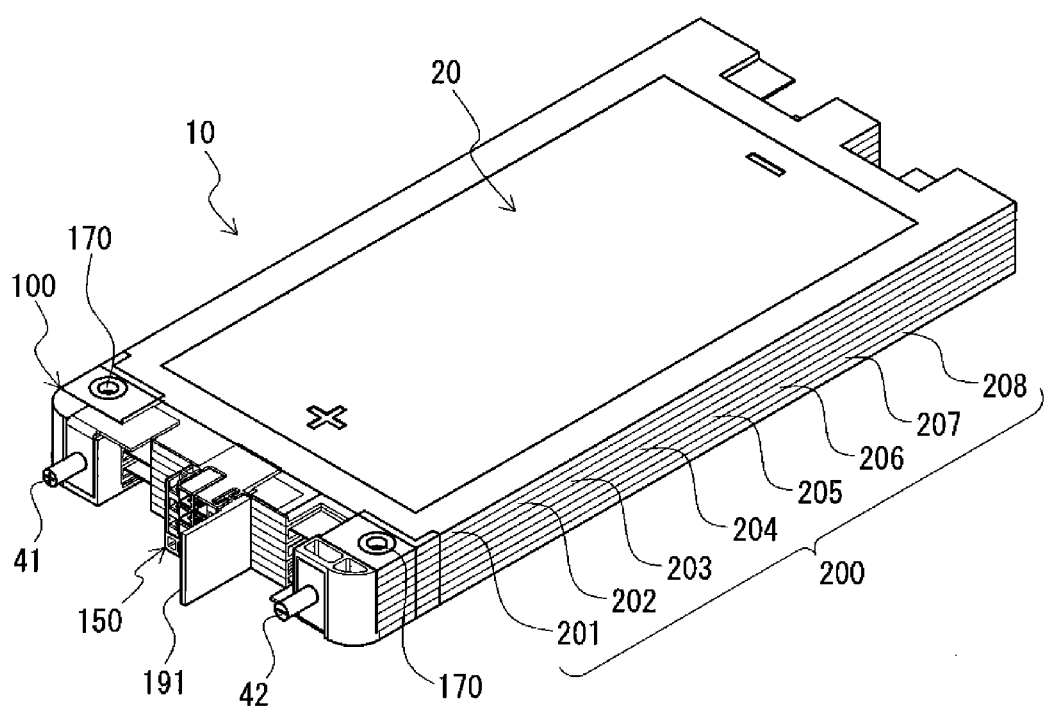
FIG. 1 is an external perspective view showing a battery module of a preferred embodiment of the present invention.
Figure 2:
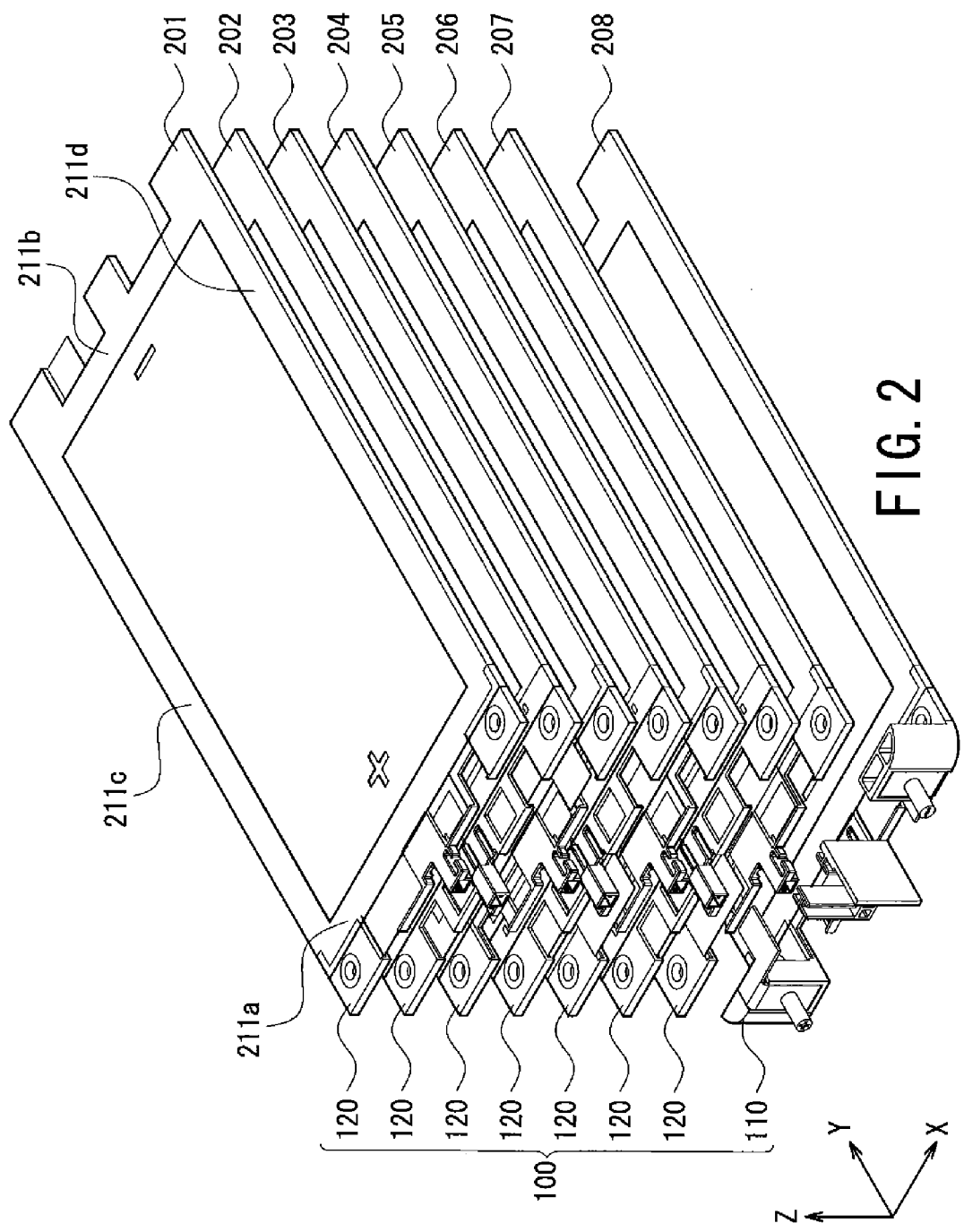
FIG. 2 is an exploded perspective view showing the battery module shown in FIG. 1.
Figure 3:
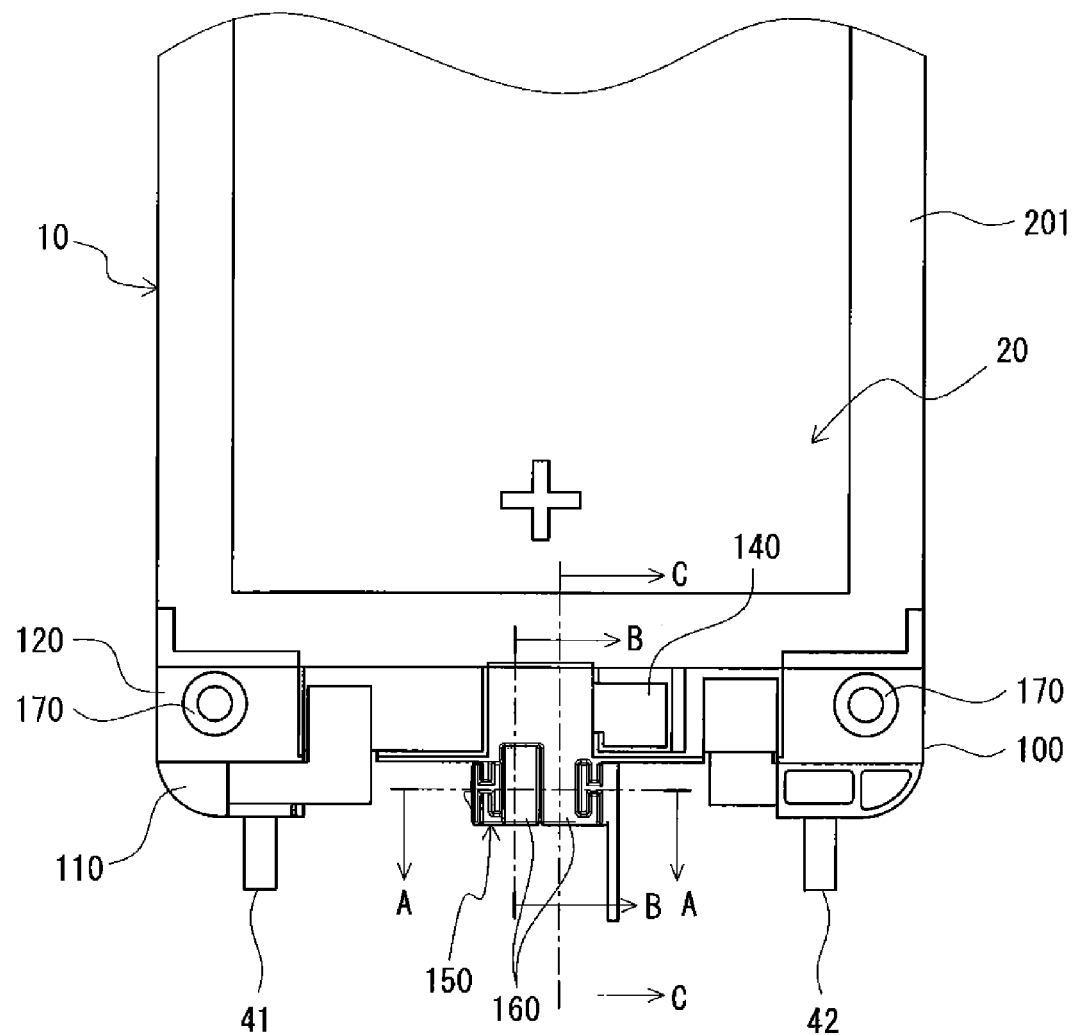
FIG. 3 is a plan view showing a part of the battery module shown in FIG. 1, the part being on the side where a connector fitting portion is disposed (i.e., on the front side).
Figure 4:
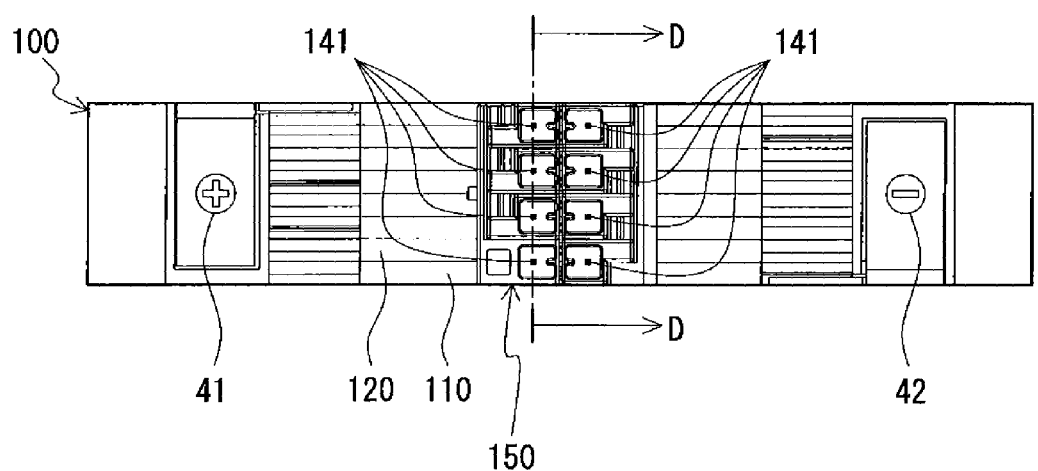
FIG. 4 is a front view showing the battery module shown in FIG. 1.

FIG. 1 is an external perspective view showing a battery module of a preferred embodiment of the present invention. FIG. 2 is an exploded perspective view showing the battery module shown in FIG. 1. FIG. 3 is a plan view showing a part of the battery module shown in FIG. 1, the part being on the side where a connector fitting portion is disposed. FIG. 4 is a front view showing the battery module shown in FIG. 1. It is to be noted that the side of the battery module where the connector fitting portion is disposed is referred to as a front side of the battery module in the present specification. A battery module 10 of the present invention includes a plurality of flat single cells such as laminate type batteries 200 (201 to 208), which are stacked in a thickness direction and electrically connected in series or in parallel, and thus defines one module (sometimes referred to also as a battery module) as shown in FIGS. 1 to 4.

The battery module 10 of the present embodiment shown in FIG. 1 includes a single-cell stack 20 including eight laminate type batteries 201 to 208 that define single cells, and a plate assembly 100 disposed at the end portion on the front side of the single-cell stack 20. The battery module 10 having this configuration is housed in a case (not illustrated) made of a metal plate such as a steel plate or an aluminum plate. A plurality of the battery modules 10 are combined to form an assembled battery, which is mounted preferably in an automobile.

In the present embodiment, the laminate type batteries 200 have a rectangular shape when seen in a plan view, and the longitudinal direction of the laminate type batteries 200 is referred to as a back/forth direction of the laminate type batteries for the sake of illustration. The direction of stacking the laminate type batteries and the plate assembly is referred to as an up/down direction, and the short direction of the laminate type batteries 200 (the longitudinal direction of the plate assembly) is referred to as a lateral direction for the sake of illustration.

In the battery module 10, the end portion on the front side of the single-cell stack 20 including the stacked laminate type batteries 201 to 208 is fixed to be held by the plate assembly 100, whereby the laminate type batteries 201 to 208 are integrated. The battery module 10 has a configuration that the plate assembly 100 is attached to the only one end portion of the single-cell stack 20.

The plate assembly 100 includes a plurality of plates corresponding to the number of laminate type batteries 200 that form the single-cell stack 20. In the present embodiment shown in FIG. 1, eight plates, which are same in number as the laminate type batteries 200 (201 to 208), are stacked to form the one plate assembly 100. The plate assembly 100 is arranged to support the end portions on the front sides of the laminate type batteries 201 to 208, and functions as an interface member arranged to electrically connect the battery module 10 and external components.

The plate assembly 100 includes output terminals 41 and 42 arranged to get electricity from the single-cell stack 20, eight voltage detecting terminals 140 arranged to be connected to electrode tabs such as positive electrode tabs and negative electrode tabs of the laminate type batteries 201 to 208 (see FIG. 14, a detailed description thereof will be provided later).

As shown in FIG. 4, four pin-shaped contact portions 141 and the other four pin-shaped contact portions 141 of the eight voltage detecting terminals 140 are disposed vertically in two rows in the direction of stacking the laminate type batteries 200 at a center position in the longitudinal direction of the plate assembly 100 (the right/left direction in FIG. 4). The total of eight pin-shaped contact portions 141 are integrated to form a cluster of terminals, which is referred to as a connector fitting portion 150.

The battery module 10 has a configuration that the voltage detecting terminals 140 connected to the eight laminate type batteries 201 to 208 can be connected at a time by fitting one connector connected with eight wiring harnesses (not illustrated) into the connector fitting portion 150 on the front side of the battery module 10.

Figure 5:
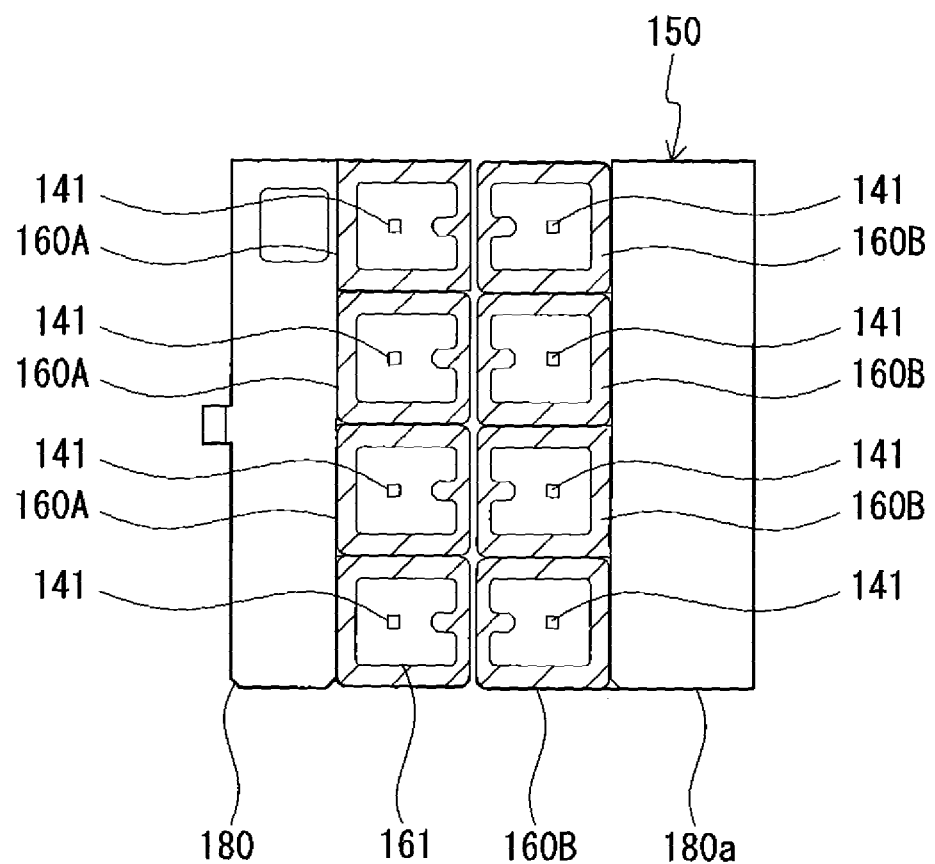
FIG. 5 is a cross-sectional view along the line A-A of FIG. 3.
Figure 6:
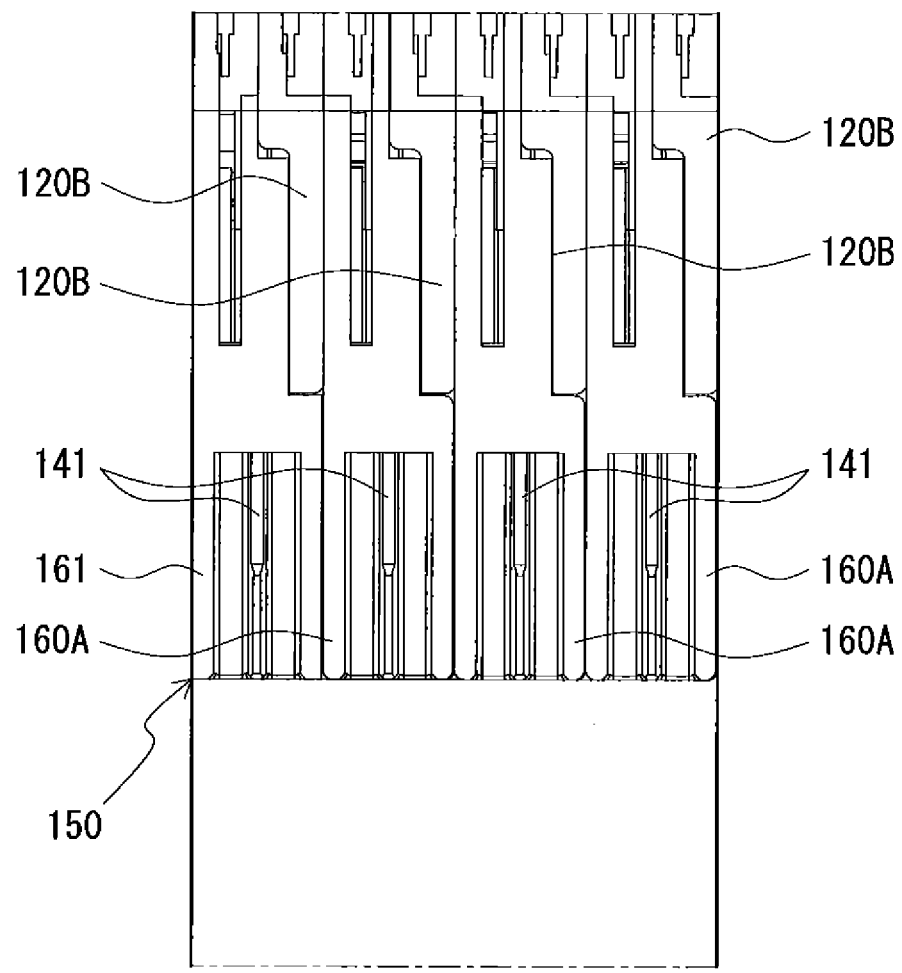
FIG. 6 is a cross-sectional view along the line B-B of FIG. 3.
Figure 7:
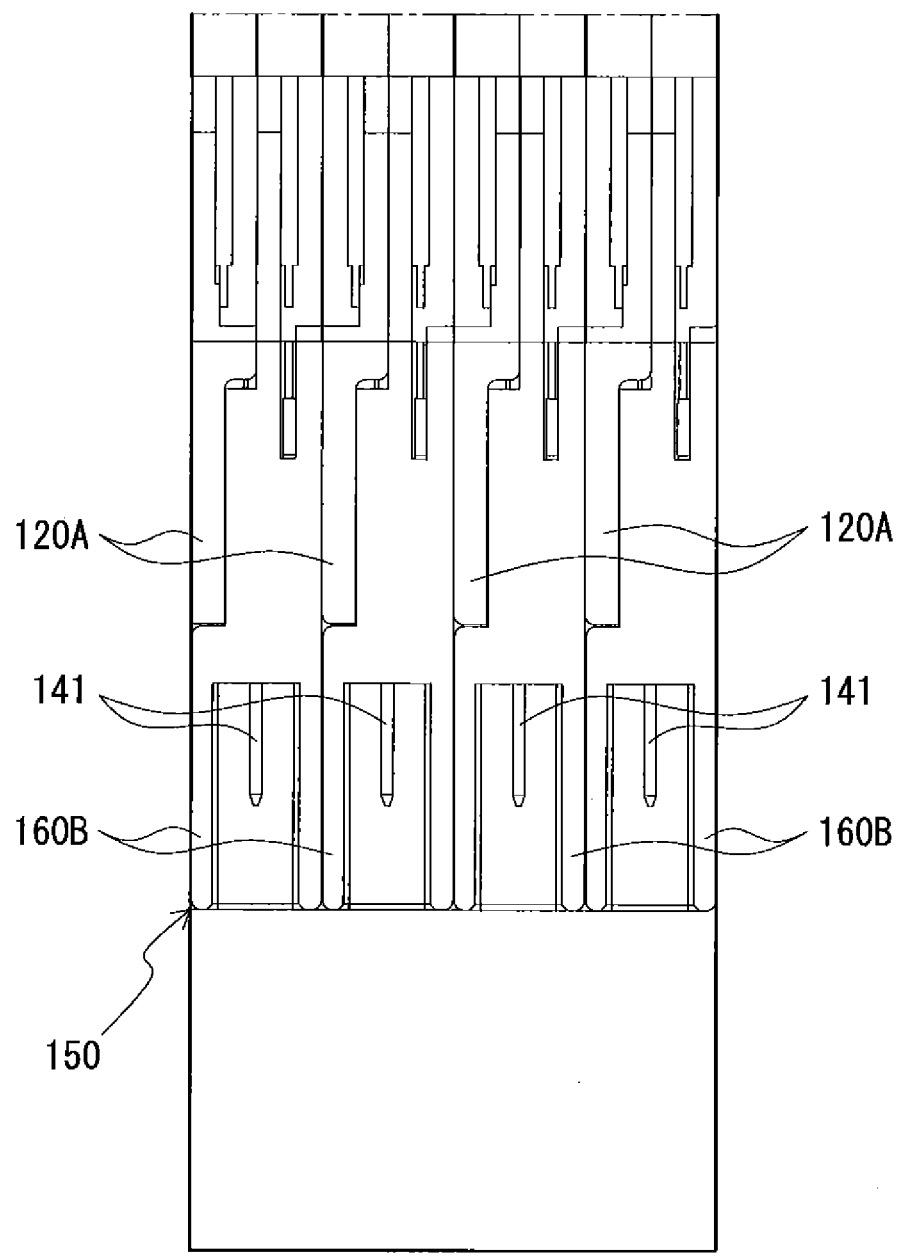
FIG. 7 is a cross-sectional view along the line C-C of FIG. 3.
Figure 8:
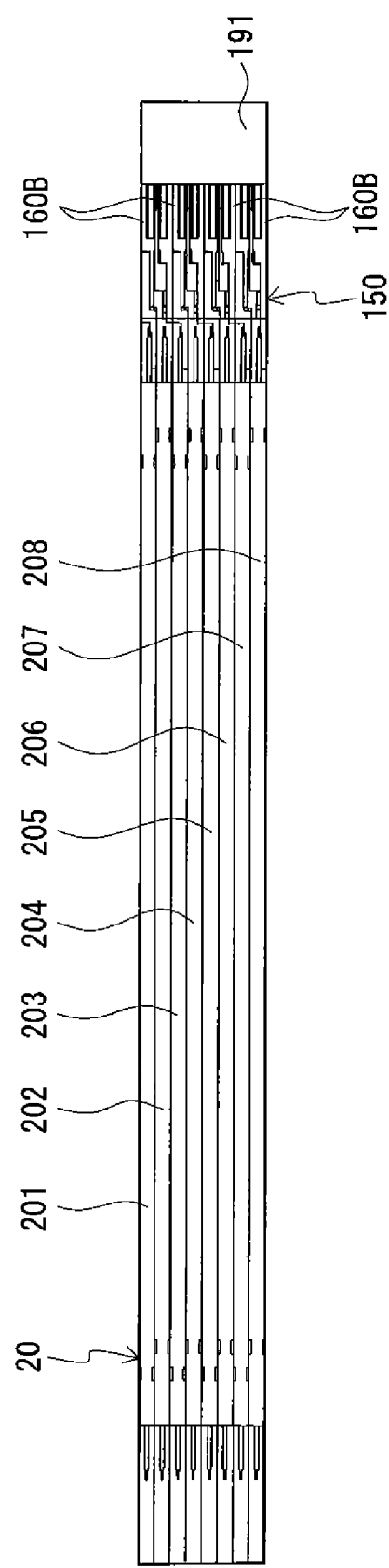
FIG. 8 is a cross-sectional view along the line D-D of FIG. 4.

FIG. 5 is a cross-sectional view along the line A-A of FIG. 3. FIG. 6 is a cross-sectional view along the line B-B of FIG. 3. FIG. 7 is a cross-sectional view along the line C-C of FIG. 3. FIG. 8 is a cross-sectional view along the line D-D of FIG. 4. Eight hood members 160 (160A, 160B, 161) arranged to cover the lateral faces of the eight pin-shaped contact portions 141 of the voltage detecting terminals 140 are provided to the connector fitting portion 150 of the plate assembly 100 as shown in FIGS. 5 to 8. The hood members 160A, 160B and 161 are arranged to separately cover the lateral faces of the pin-shaped contact portions 141. The connector fitting portion 150 is partitioned into eight pieces for the pin-shaped contact portions 141 with the hood members 160A, 160B and 161. The hood members 160A, 160B and 161 have a square cylinder shape having a square cross section, are open at the front sides, and have a length so as to cover the lateral faces of the pin-shaped contact portions 141. The pin-shaped contact portions 141 have a configuration of not protruding to the front side beyond the front faces of the hood members 160A, 160B and 161.

In the connector fitting portion 150, the pin-shaped contact portions 141 are protected by the hood members 160A, 160B and 161 that are provided to the voltage detecting terminals 140. Further, the right side faces of the hood members 160A and 161 are in contact with the hood members 160B on the left side. The hood members 160A, 160B and 161 are in contact with the hood members disposed above or below them. Because the lateral faces of the pin-shaped contact portions 141 are protected by the hood members 160A, 160B and 161, the pin-shaped contact portions 141 can be held at predetermined positions. In addition, the hood members 160A, 160B and 161 function to perform the positioning of a male hood of the connector connected with the eight wiring harnesses when the connector are fitted into the connector fitting portion 150, and also function as a guide member for connector insertion.

Figure 9:
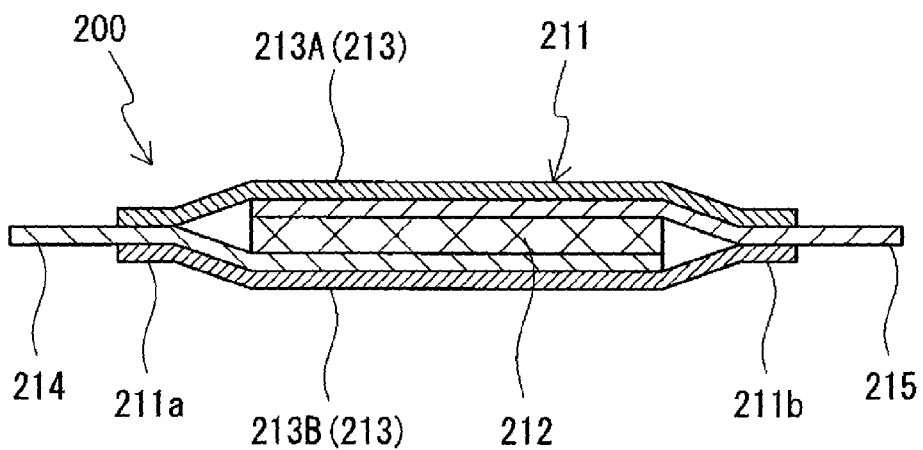
FIG. 9 is a cross-sectional view schematically showing a laminate type battery.

FIG. 9 is a cross-sectional view schematically showing one of the laminate type batteries shown in FIG. 1 as an example. The laminate type batteries 201 to 208 define flat thin cells such as lithium-ion secondary cells. Each of the laminate type batteries 201 to 208 basically includes the internal structure shown in FIG. 9. It is to be noted that the positions and the shapes of the positive electrode tabs and the negative electrode tabs may be different from those shown in FIG. 9.

Each laminate type battery 200 includes a battery body 211 including an electric power generation element 212 containing an electrolytic solution, and an exterior package 213 consisting of a laminated film 213A and a laminated film 213B, with which the electric power generation element 212 is sealed, a positive electrode tab 214, and a negative electrode tab 215, the tabs 214 and 215 being drawn to the outside from the electric power generation element 212, as shown in FIG. 9.

The positive electrode tabs 214 and the negative electrode tabs 215 are used as output terminals arranged to get electricity, or as voltage detecting tabs to which the voltage detecting terminals are to be attached. It is also preferable to connect the positive electrode tab 214 and the negative electrode tab 215 with separate voltage detecting tabs, to which the voltage detecting terminals 140 are to be attached.

Each laminate type battery 200 has a configuration that the electric power generation element 212 is sandwiched between the laminated film 213A and the laminated film 213B, and the rims of the laminated film 213A and the laminated film 213B are welded to form bonded portions 211a, 211b, 211c and 211d (see FIG. 2) where the films are bonded. Thus, each laminate type battery 200 has a pouch shape.

Examples of the electrolytic solution used in the electric power generation element 212 include an electrolytic solution prepared by dissolving electrolyte salt in a nonaqueous medium, and a polymer-gel electrolyte containing a solution, which is prepared by dissolving electrolyte salt in a nonaqueous medium, in a polymer matrix. Lithium salt exhibiting ion conductivity is used for the electrolyte salt. Examples of the lithium salt include $LiClO_4$, $LiAsF_6$, $LiPF_6$, $LiBF_4$, $LiB(C_6H_5)_4$, LiCl, LiBr, $CH_3SO_3Li$, and $CF_3SO_3Li$. Among them, one kind may be used alone, or two or more kinds may be used in combination.

A bipolar battery having a laminated structure such that bipolar electrodes are stacked sandwiching electrolyte layers therebetween is preferably used for the electric power generation element 212. The bipolar electrodes include electrical power collectors of which anode active material layers are formed on one faces while cathode active material layers are formed on the other faces (not illustrated). The bipolar battery has a configuration that a plurality of single cell layers are stacked, each of which consists of the anode active material layer, the electrolyte layer, and the cathode active material layer. Further, insulation layers arranged to insulate the adjacent electrical power collectors are provided around the single cell layers.

Each positive electrode plate of the electric power generation element 212 preferably includes an anode active material layer of lithium transition metal composite oxide such as $LiMn_2O_4$. Each negative electrode plate of the electric power generation element 212 preferably includes a cathode active material layer of carbon and lithium transition metal composite oxide. Each separator is made from porous polyethylene that is breathable to allow the electrolytic solution to penetrate.

As shown in FIG. 9, the outermost electrical power collector is extended to be drawn to the outside of the exterior package 213 to be formed as the thin positive electrode tab 214 on the positive electrode side of the electric power generation element 212. Meanwhile, the outermost electrical power collector is extended to be drawn to the outside of the exterior package 213 to be formed as the thin negative electrode tab 215 on the negative electrode side of the electric power generation element 212. The positive electrode tab 214 and negative electrode tab 215 are drawn to the outside of the battery body 211 from the bonded portions 211a at the end portion on the front side of the battery body 211 and the bonded portions 211b at the end portion on the posterior side of the battery body 211, respectively.

It is also preferable that each electric power generation element 212 has a structure other than the bipolar battery structure. For example, preferably used is a battery, which includes a battery body, a positive electrode tab, and a negative electrode tab, where the battery body includes an electric power generation element and an exterior package with which the electric power generation element is sealed, and the electric power generation element includes a positive electrode plate including an electrical power collector of which anode active material layers are formed on both the faces, a negative electrode plate including an electrical power collector of which cathode active material layers are formed on both the faces, and a separator sandwiched between the stacked electrode plates, and where the positive electrode tab is electrically connected to the positive electrode plate, and the negative electrode tab is electrically connected to the negative electrode plate, the tabs being drawn to the outside of the battery body.

The two laminated film 213A and laminated film 213B of the exterior package 213 preferably define polymer-metal composite laminated films that are prepared by covering metal (including an alloy) such as aluminum, a stainless steel, nickel and copper with insulators such as polypropylene films. By using the laminated films as the exterior package, each laminate type battery 200 can be reduced in weight and thickness. Thus, each laminate type battery 200 defines a thin single cell that is flexible and capable of radiating heat.

Figure 10:
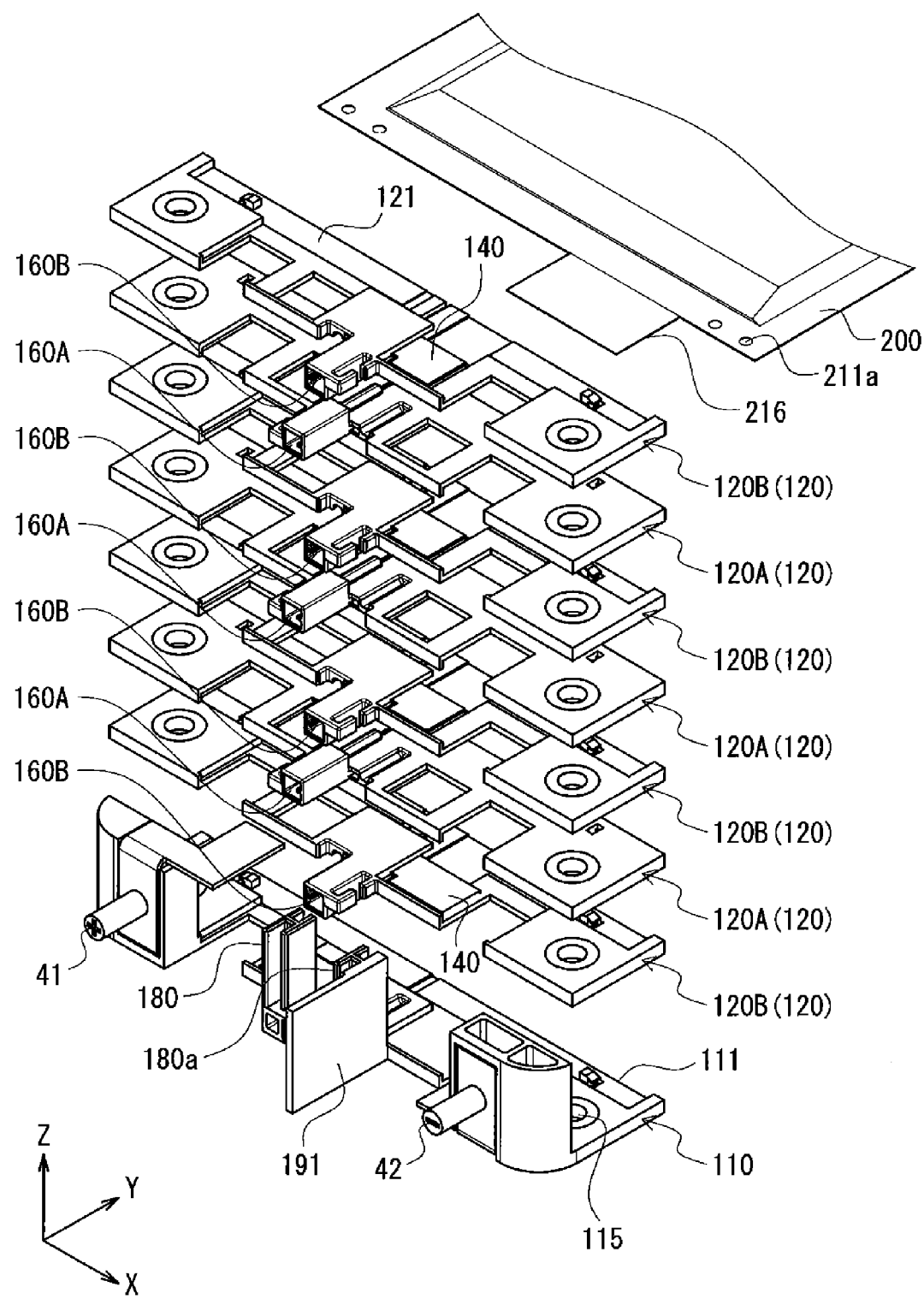
FIG. 10 is an exploded perspective view showing the plate assembly shown in FIG. 1.
Figure 11:
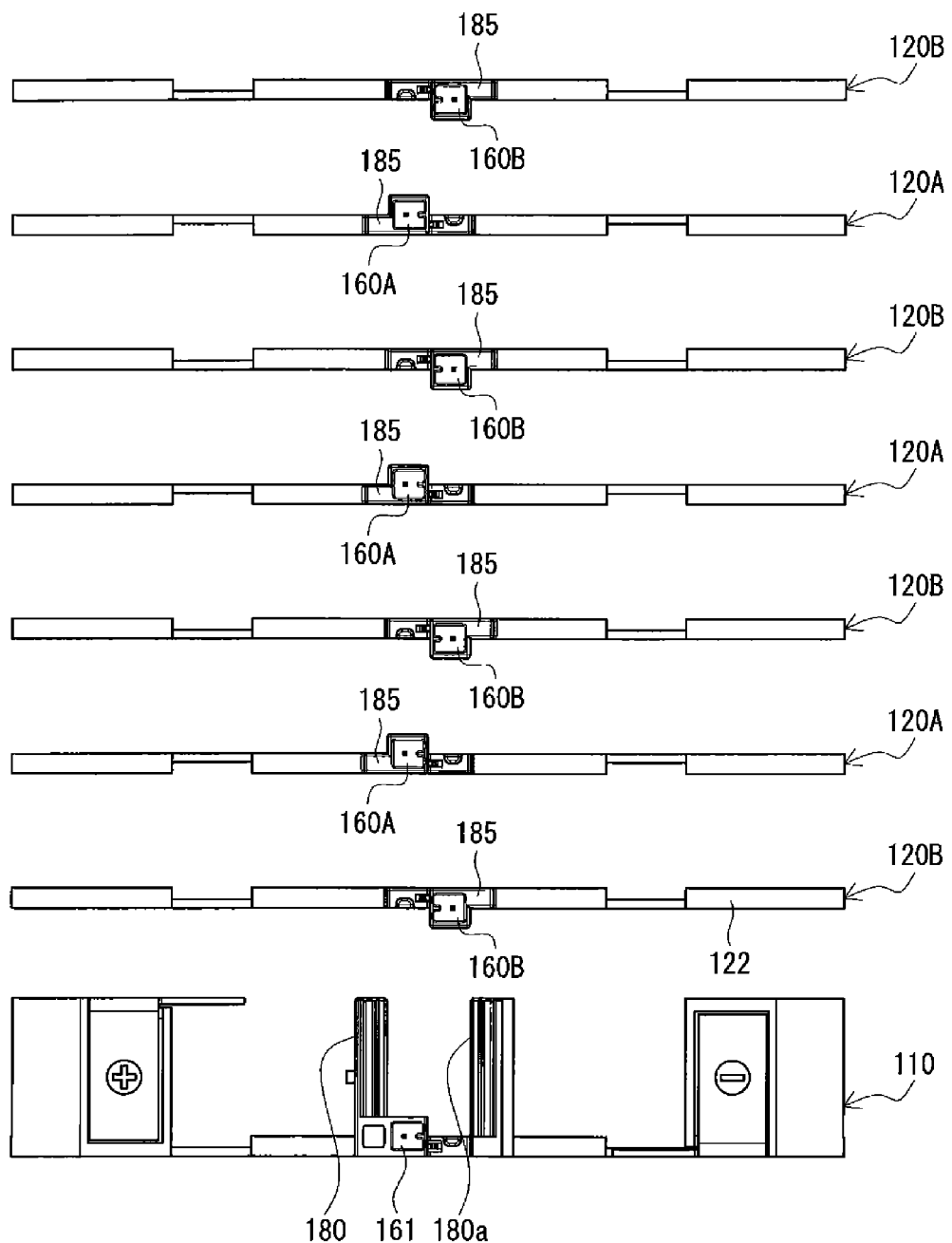
FIG. 11 is an exploded front view showing the plate assembly shown in FIG. 1.

FIG. 10 is an exploded perspective view showing the plate assembly shown in FIG. 1. FIG. 11 is an exploded front view showing the plate assembly shown in FIG. 1. The plate assembly 100 includes two kinds of plates: a guide plate 110 and terminal-attached plates 120. A total of eight plates consisting of one guide plate 110 and seven terminal-attached plates 120 are included in the plate assembly 100 as shown in FIGS. 2, 10 and 11. Hereinafter, a detailed description of the plate assembly 100 will be provided.

In the plate assembly 100, the guide plate 110 is bottommost, on which the seven terminal-attached plates 120 are stacked. Each terminal-attached plate 120 corresponds to the terminal-attached plate of the present invention. The terminal-attached plates 120 are turned back alternately to be stacked. To be specific, in the plate assembly 100, the guide plate 110 is bottommost, on which the first terminal-attached plate 120B that is turned back, the second terminal-attached plate 120A, the third terminal-attached plate 120B that is turned back, the fourth terminal-attached plate 120A, the fifth terminal-attached plate 120B that is turned back, the sixth terminal-attached plate 120A, and the seventh terminal-attached plate 120B that is turned back are stacked in this order from the bottom as shown in FIGS. 10 and 11.

Each of the guide plate 110 and the terminal-attached plates 120 of the plate assembly 100 includes a joining portion 121, with which the plate is joined to the bonded portion 211a at the end portion on the front side of the laminate type battery 200. Each of the guide plate 110 and the terminal-attached plates 120 of the plate assembly 100 is mounted with one voltage detecting terminal 140, and either one of the hood members 160A, 160B and 161 arranged to cover the pin-shaped contact portions 141 of the voltage detecting terminals 140. It is preferable that the guide plate 110 and the terminal-attached plates 120, except the voltage detecting terminals 140 and color portions 115 and 125 (see FIGS. 12A and 13A), are made from insulation materials such as a resin and rubber. These plates have flat bottom faces from which no protrusion is protruded, basically.

Figure 12A:
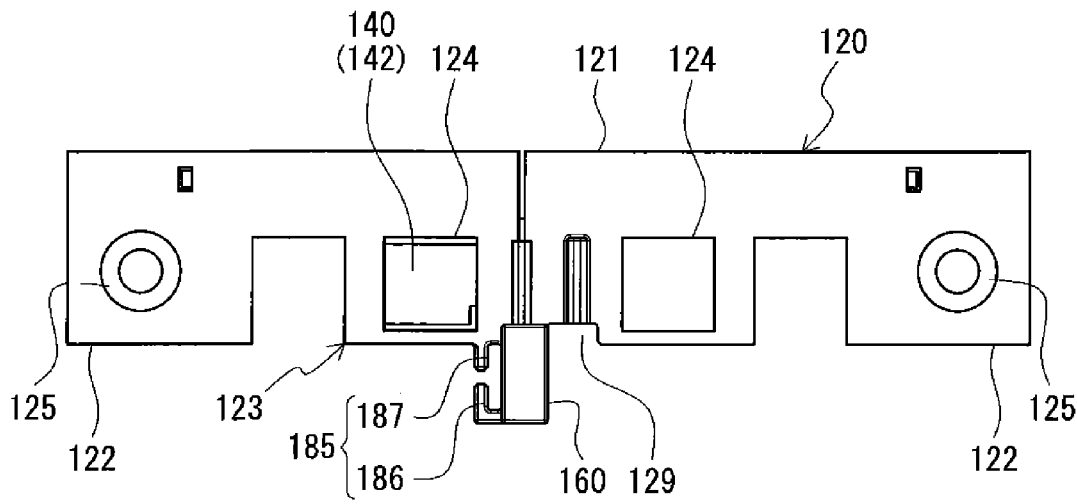
FIG. 12A is a plan view showing the terminal-attached plate included in the battery module shown in FIG. 1.
Figure 12B:
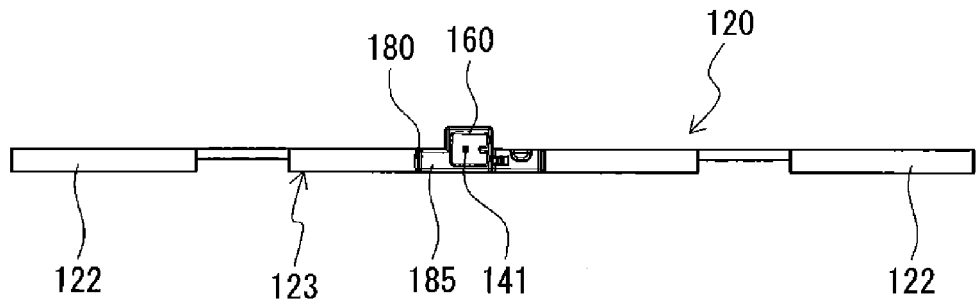
FIG. 12B is a front view showing the same.
Figure 12C:
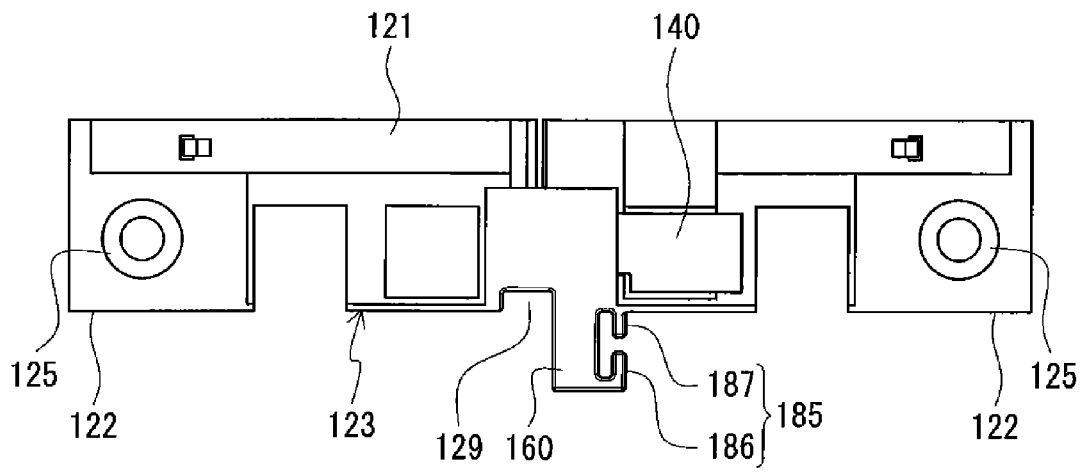
FIG. 12C is a plan view showing the terminal-attached plate that is turned back.

FIG. 12A is a plan view showing one of the terminal-attached plates 120. FIG. 12B is a front view showing the same. FIG. 12C is a plan view showing one of the terminal-attached plates 120, which is turned back. Each terminal-attached plate 120 includes the joining portion 121, with which the plate is joined to the end portion of the laminate type battery, right and left plate supporting portions 122 arranged to support another plate that is stacked on the plate, and a terminal-holding portion 123 disposed between the plate supporting portions 122 as shown in FIGS. 12A, 12B and 12C. The terminal-holding portions 123 of the terminal-attached plates 120 are mounted with the voltage detecting terminals 140.

Figure 14:
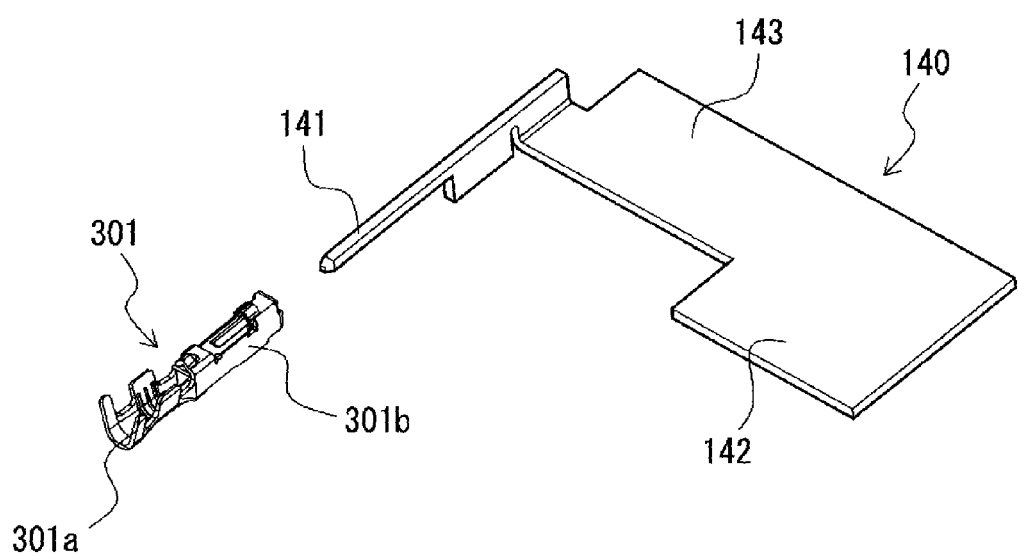
FIG. 14 is an external perspective view showing a terminal to be included in the terminal-attached plate, and a terminal of a connector.
Figure 15:
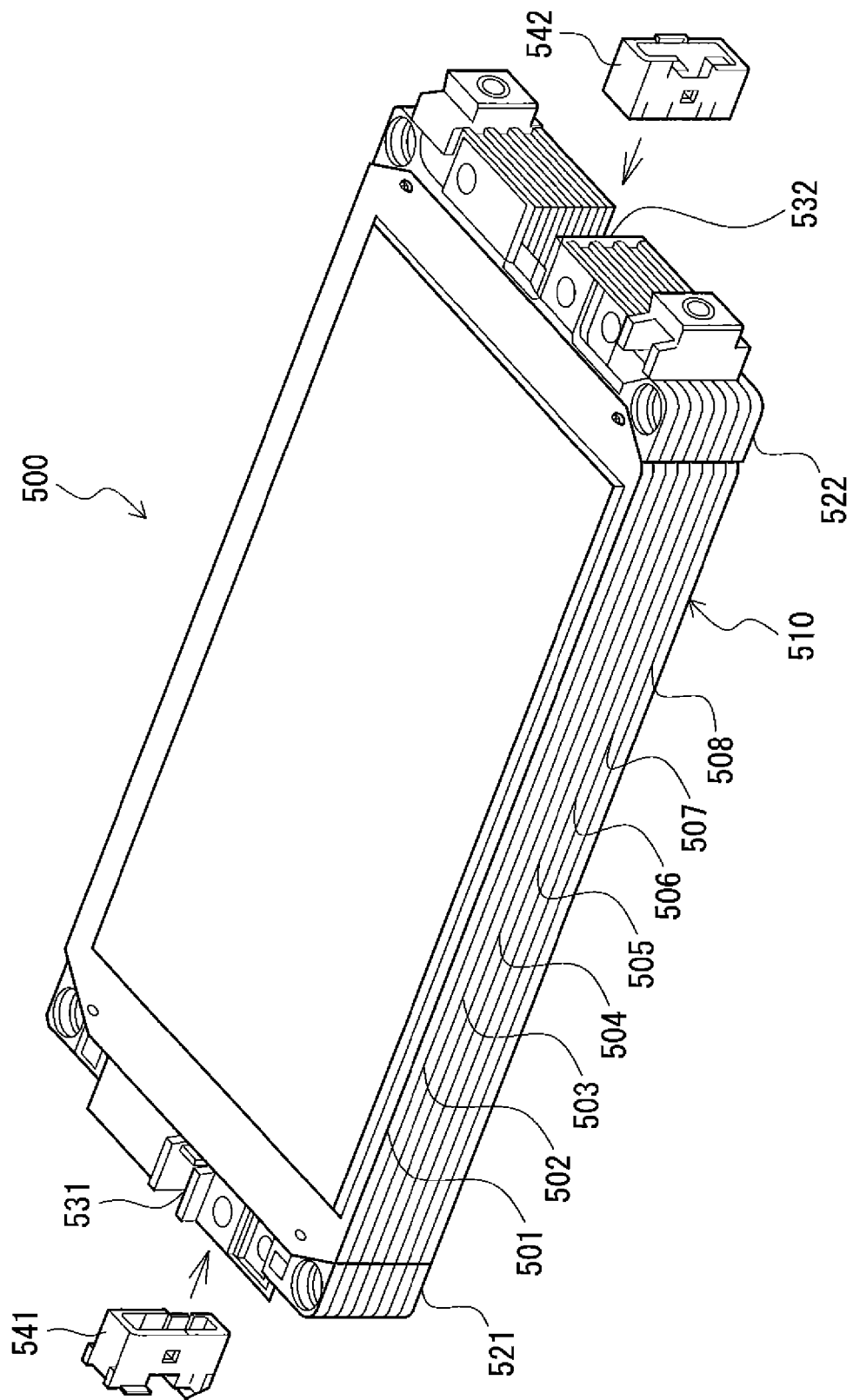
FIG. 15 is an explanatory view showing one example of a conventional battery module.

FIG. 14 is a perspective view showing one of the voltage detecting terminals, and a box terminal. Each voltage detecting terminal 140 includes the pin-shaped contact portion 141, with which the terminal is arranged to be connected to the connector connected with the wiring harnesses, and a flat connecting portion 142, which is arranged to hold the terminal itself, and with which the terminal is arranged to be connected to a voltage detecting tab 216 of the laminate type battery 200 as shown in FIG. 14. In the voltage detecting terminals 140, the pin-shaped contact portions 141 protrude more to the front than the connecting portions 142. In addition, each voltage detecting terminal 140 includes a connecting portion 143 that is shorter in the back/forth direction than the connecting portion 142 and disposed between the pin-shaped contact portion 141 and the connecting portion 142. The voltage detecting terminals 140 are produced by stamping a metal plate made from copper, a copper alloy or aluminum. Box terminals 301 are disposed on the connector side. The box terminals 301 include barrel portions 301a and box terminal portions 301b. Electric wires of the wiring harnesses are connected to the barrel portions 301a. The pin-shaped contact portions 141 are inserted into the box terminal portions 301b.

Each terminal-holding portion 123 of each terminal-attached plate 120 includes two openings 124 on both sides of the center in the width direction as shown in FIGS. 12A, 12B and 12C. The hood members 160 arranged to cover the lateral faces of the pin-shaped contact portions 141 of the voltage detecting terminals 140 are mounted on the terminal-holding portions 123 so as to protrude to the front. Guided members 185 are provided on the left side faces of the hood members 160.

The voltage detecting terminals 140 are fixed to the terminal-holding portions 123 of the terminal-attached plates 120 in a method for burying the voltage detecting terminals 140 by molding, or by means of pressing.

The voltage detecting terminals 140 are mounted such that the connecting portions 142 approach the openings 124, the pin-shaped contact portions 141 are disposed inside of the hood members 160, and the hood members 160 cover the lateral faces of the pin-shaped contact portions 141. The pin-shaped contact portions 141 are mounted on the terminal-holding portions 123 so as to be disposed inside of the hood members 160.

The hood members 160 are disposed at positions that are offset to the left end portion sides of the plates from the centers in the longitudinal directions (width directions) of the plates. The offset positions of the hood members 160 are displaced to the left so that when some of the terminal-attached plates 120 are turned back and stacked on the other terminal-attached plates 120, the positions of the hood members 160 of the some terminal-attached plates 120 are disposed at immediate right positions to the hood members 160 of the other terminal-attached plates 120. To be specific, when the terminal-attached plate 120 shown in FIG. 12A is turned back, the hood member 160 is displaced to the right from the center in the width direction of the terminal-attached plate 120, and is disposed at immediate right position to the hood member 160 of the terminal-attached plate 120 disposed below, as shown in FIG. 12C.

In addition, in the terminal-attached plates 120, the hood members 160 protrude more above than the supporting portions 122 as shown in FIG. 12B. The height of the protruding portions of the hood members 160 is same as the thickness of the supporting portions 122. Further, concave portions 129, into which posterior end portions of the hood members 160 of the terminal-attached plates 120 that are turned back are to be fitted, are provided adjacent to the terminal-holding portions 123. Thus, when the two adjacent terminal-attached plates 120A and 120B shown in FIG. 11 are stacked, the vertically adjacent hood members 160A and 160B do not interfere with each other. Consequently, the two adjacent hood members 160A and 160B are disposed in a lateral direction in the plate assembly 100 as shown in FIG. 5.

The guided members 185 are provided on the lateral faces of the hood members 160. The guided members 185 have the shape slidable in the up/down direction, which defines the plate-stacking direction, and insertable into a first guide plates 181 and 181*a* of guide members 180 and 180*a* of the guide plate 110. The guided members 185 include front locking portions 186 and posterior locking portions 187 that are arranged to pinch the first guide plates 181 and 181*a* of the guide members 180 and 180*a* from the front side and back side. The thicknesses in the up/down direction of the front locking portions 186 and posterior locking portions 187 are same as those of the supporting portions 122. In stacking the terminal-attached plates 120 on the guide plate 110 to build the plate assembly 100, the guided members 185 are inserted into the guide member 180, and positioned at predetermined positions.

The supporting portions 122 on both the end portions of the terminal-attached plates 120 include the color portions 125 in which metal colors are buried.

Figure 13A:
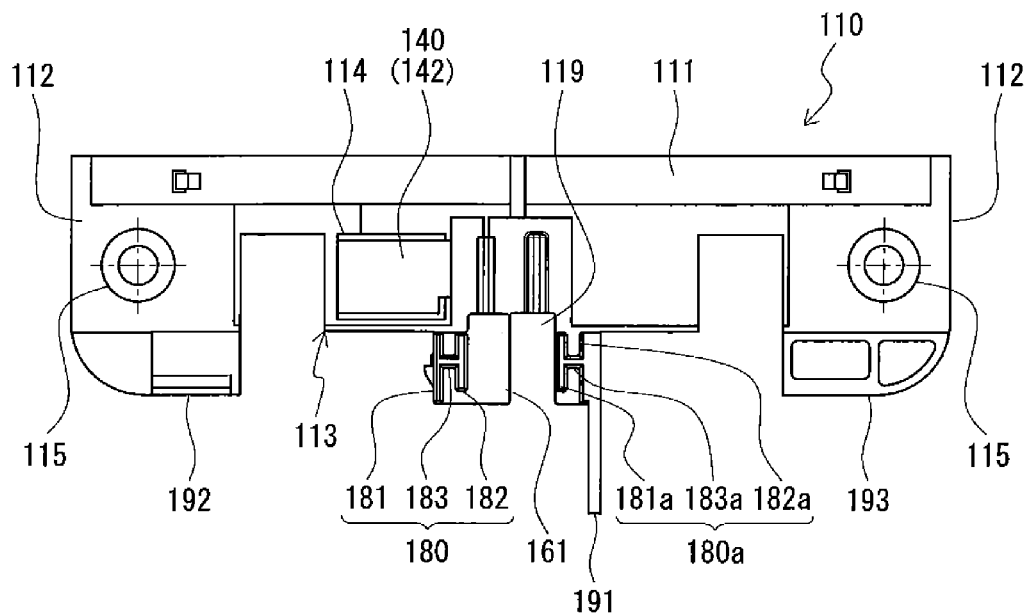
FIG. 13A is a plan view showing the guide plate included in the battery module shown in FIG. 1.
Figure 13B:
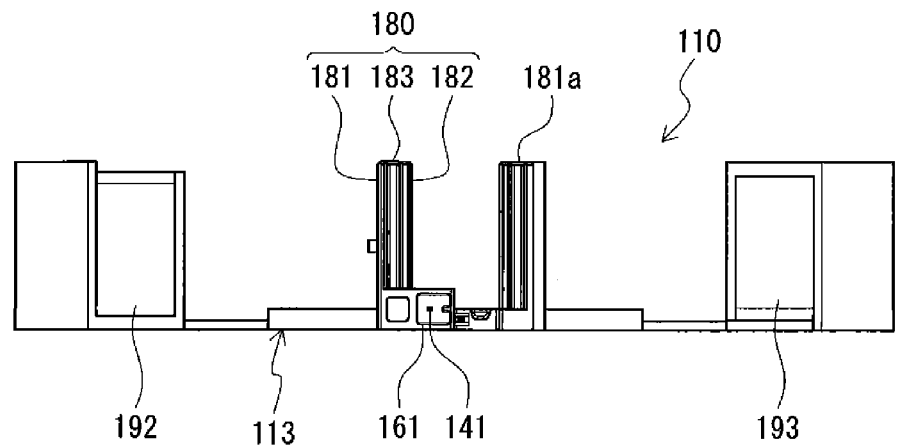
FIG. 13B is a front view showing the same.

FIG. 13A is a plan view showing the guide plate. FIG. 13B is a front view showing the same. The guide plate 110 includes a joining portion 111 on the posterior side in a short direction of the plate, which has a flat plate shape with which the plate is joined to the laminate type battery, plate supporting portions 112 on both end portions on the front side in a longitudinal direction of the plate, which are arranged to support the plates, a terminal-holding portion 113 between the plate supporting portions 112, and the guide members 180 and 180*a* arranged to guide the guided members 185 of the terminal-attached plates 120 stacked thereon as shown in FIGS. 13A and 13B. The voltage detecting terminal 140 is fixed to a determined position in the terminal-holding portion 113. The voltage detecting terminal 140 is connected to a voltage detecting tab 216 of the laminate type battery 200.

The terminal-holding portion 113 of the guide plate 110 includes a rectangular opening 114 that penetrates the upper and lower faces of the plate as shown in FIGS. 13A and 13B. The hood member 161 arranged to cover the lateral faces of the pin-shaped contact portion 141 of the voltage detecting terminal 140 is mounted on the terminal-holding portion 113 at the center in a width direction of the plate.

The voltage detecting terminal 140 is mounted such that the connecting portion 142 approaches the opening 114, the pin-shaped contact portion 141 is disposed inside of the hood member 161, and the hood member 161 covers the lateral faces of the pin-shaped contact portion 141. The pin-shaped contact portion 141 is mounted on the terminal-holding portion 113 so as to be disposed inside of the hood member 161. The hood member 161 is disposed at a position that is offset to the left end portion side of the plate from the center in the longitudinal direction (width directions) of the plate. The offset position of the hood member 161 is displaced to the left so that when some of the terminal-attached plates 120 are turned back and stacked thereon, the positions of the hood members 160 of the some terminal-attached plates 120 are disposed at immediate right positions to the hood member 161. The offset position of the hood member 161 corresponds to the offset positions of the hood members 160 of the terminal-attached plates 120.

The hood member 161 of the guide plate 110 is large enough to protrude more above than the supporting portions 112. The height of the protruding portion of the hood member 161 is same as the thickness of the supporting portions 122 of the terminal-attached plate 120 stacked thereon (described later). Further, an opening 119, into which a protruding portion of the hood member 160 of the terminal-attached plate 120 that is turned back to be stacked on the light guide plate 110 is to be fitted, is provided on the right side adjacent to the hood member 161 of the guide plate 110. A voltage detecting terminal having the same configuration as the voltage detecting terminals 140 of the terminal-attached plates 120 can be used as the voltage detecting terminal 140 of the guide plate 110. The hood member 161 of the guide plate 110 has the same shape as the hood members 160 of the terminal-attached plates 120.

The voltage detecting terminal 140 of the guide plate 110 is fixed to the guide plate 110 while a portion of the voltage detecting terminal 140 is buried in the terminal-holding portion 113 in the same manner as the voltage detecting terminals 140 of the terminal-attached plates 120. To be specific, the guide plate 110 including the voltage detecting terminal 140 a part of which is buried therein can be obtained by injecting a resin in a die in which the voltage detecting terminal 140 is disposed at a given position during a molding process of the guide plate 110. It is also preferable to provide a press-fit portion such as a slit to the terminal-holding portion 113 to fix the voltage detecting terminal 140 to the terminal-holding portion 113.

The pair of guide members, which consist of the one guide members 180 and the other guide member 180*a* disposed at positions opposed to each other sandwiching the hood member 161, are provided to the terminal-holding portion 113 of the guide plate 110. To be specific, the one guide member 180 arranged to limit the positions of the terminals of the terminal-attached plates 120 is disposed on the left side face of the hood member 161. The other guide member 180*a* arranged to limit the positions of the terminals of the terminal-attached plates 120 is opposed to the one guide member 180 while sandwiching the hood member 161 and the opening 119, into which the hood member 160 of the terminal-attached plate 120 stacked thereon is to be fitted. The one guide member 180 and the other guide member 180a are disposed at positions apart from the center in the lateral direction of the guide plate 110 by the width of the hood members 160 or 161. The guide members 180 and 180a are used to limit the movement in battery surface directions of the terminal-attached plates 120 to guide the movement in the plate-stacking direction.

In the guide plate 110, the one guide member 180 and the hood member 161 are of a monolithic construction. The guide member 180 is provided so as to stand in the plate-stacking direction, and includes the plate-shaped first guide plate 181, a plate-shaped second guide plate 182, and a connecting member 183 connecting them. The guide member 180 has an H-letter shape cross section.

Likewise, the other guide member 180a is provided so as to stand in the plate-stacking direction, and includes the plate-shaped first guide plate 181a, a plate-shaped second guide plate 182a, and a connecting member 183 connecting them. The guide member 180 has an H-letter shape cross section. The heights of the guide members 180 and 180a are same as the thickness of the plate assembly such that the seven terminal-attached plates 120 are inserted therein to be guided thereby.

The supporting portions 112 on the both end portions of the guide plate 110 include the color portions 115 in which metal colors are buried as shown in FIG. 13. The color portions 115 include through holes that penetrate the upper and lower faces of the plate.

As shown in FIGS. 10 and 11, in building the plate assembly from the guide plate 110 and the terminal-attached plates 120, the terminal-attached plate 120B that is turned back is stacked on the guide plate 110. When the guided member 185 of the terminal-attached plate 120B is inserted into the guide member 180a of the guide plate 110, the guided member 185 is guided by the guide member 180a, and the terminal-attached plate 120B is mounted at a predetermined position on the guide plate 110. The hood member 160B of the terminal-attached plate 120B that is turned back is disposed at the position adjacent to the hood member 161 of the guide plate 110 as shown in FIG. 5. The hood member 160B of the terminal-attached plate 120B that is turned back projects more below than the lower faces of the supporting portions 122 as shown in FIG. 11. The protruding portion of the hood member 160B is fitted into the opening 119 of the guide plate 110. Because the height of the protruding portion of the hood member 161 is same as the thickness of the first terminal-attached plate 120B, the upper faces of the hood members 161 and 160B are on the same level, so that the upper face of the hood member 161 does not protrude more above than the first terminal-attached plate 120B.

Then, the second terminal-attached plate 120A that is not turned back is stacked on the first terminal-attached plate 120B that is turned back. When the guided member 185 of the second terminal-attached plate 120A is inserted into the left guide member 180 of the guide plate 110, the guided member 185 is guided by the guide member 180, and the second terminal-attached plate 120A is mounted at a predetermined position on the first terminal-attached plate 120B. Because the second terminal-attached plate 120A has the flat lower face, the hood member 160A is stacked on the hood member 161 as shown in FIG. 5.

Then, the third terminal-attached plate 120B that is turned back is stacked on the second terminal-attached plate 120A that is not turned back. When the guided member 185 of the third terminal-attached plate 120B is inserted into the left guide member 180a of the guide plate 110, the guided member 185 is guided by the guide member 180, and the third terminal-attached plate 120B is mounted at a predetermined position. The hood member 160B is stacked directly on the hood member 160B of the first terminal-attached plate 120B that is turned back, and disposed at the position adjacent to the hood member 160A of the second terminal-attached plate 120A below as shown in FIG. 5. The third terminal-attached plate 120B that is turned back protrudes below, and the protruding portion of the hood member 160B is fitted into the opening 129 of the second terminal-attached plate 120A below.

In this manner, the fourth terminal-attached plate 120A, the fifth terminal-attached plate 120B, the sixth terminal-attached plate 120A, and the seventh terminal-attached plate 120B are stacked in this order on the stacked plates. The hood members 161, 160A, 160A and 160A are vertically stacked in a row, and the four hood members 161B are vertically stacked in a row on the right side adjacent thereto, and thus the eight hood members consisting of the two rows of the four hood members are integrated to form the connector fitting portion 150 as shown in FIG. 5. The hood members 161, 160A and 160B are integrated while their portions adjacent to one another in the up/down direction and the lateral direction are in contact with one another. The pin-shaped contact portions 141 of the voltage detecting terminals 140 are disposed inside of the hood members 161, 160A and 160B. Thus, in building the plate assembly, the hood members 160A of the terminal-attached plates 120A that are not turned back and adjacent to each other in the plate-stacking direction overlap each other, while the hood members 160B of the terminal-attached plates 120B that are turned back and adjacent to each other in the plate-stacking direction overlap each other.

The joining portions 111 and 121 of the plates are joined to the bonded portions at the end portion of the laminate type batteries 201 to 208 with resins or adhesives such as a hot-melt adhesive as shown in FIGS. 2 and 10. It is to be noted that shown in FIG. 2 is one laminate type battery. The voltage detecting terminals 140 of the plates are connected to the voltage detecting tabs 216 of the laminate type batteries 201 to 208 preferably by the means of ultrasonic welding, welding or adhesive joining. In the connector fitting portion 150, the eight pin-shaped contact portions 141 connected to the voltage detecting tabs 216 of the laminate type batteries 201 to 208 are integrated. Thus, connecting the connector fitting portion 150 at the one end portion of the battery module 10 and the connector connected with the wiring harnesses allows voltage measurement of all the laminate type batteries.

As described above, the terminal-attached plates 120 have the configurations that the hood members 160 are disposed at the positions offset in the lateral directions from the centers by the width of the hood members 160. That is, the offset positions of the hood members are positions where the hood members are adjacent to each other when the terminal-attached plates 120 that are turned back and the terminal-attached plates 120 that are not turned back are stacked alternately. Thus, using the terminal-attached plates 120 while turned back alternately allows the terminal-attached plates 120, which are actually of one kind, to be used as two kinds of members that include the hood members 160 disposed at different positions. In addition, because the offset positions of the hood members 160 from the centers correspond with the width of the hood members 160, the hood members 160A and 160B of the vertically adjacent terminal-attached plates 120 are disposed at the positions adjacent to each other when the terminal-attached plates 120B that are turned back are stacked on the terminal-attached plates 120A. Thus, the positions of the contact portions of the terminals are not wider in the lateral direction than necessary, so that the contact portions can be minimized in size.

The hood members 160 are mounted on the supporting portions 122 so as to protrude to the front, and to protrude above by the thickness of the supporting portions 122. Because the hood members 160A and 160B are disposed at the offset positions, when the terminal-attached plates 120B that are turned back and the terminal-attached plates 120A are stacked, the hood members 160A and 160B do not interfere with each other in the thickness direction. The height in the plate-stacking direction of the plate assembly 100 corresponds with the thickness of the stacked supporting portions 122. It is preferable that the thickness of the supporting portions is half the height of the hood members 160A, 160B and 161. In addition, it is unnecessary to use plates having the function of spacers in the plate assembly 100, so that the number of components can be reduced.

In addition, because the hood members 160 and 161 can be made higher than the thickness of the supporting portions as described above, when the hood members 160 and 161 define hoods for pin-shaped contact portions, space can be sufficiently obtained around the contact portions. Thus, the hood members 160 and 161 are excellent in protecting effect.

In addition, the guide plate 110 includes a short-preventing wall 191 arranged to prevent shorts in the terminals 41 and 42 (see FIG. 1) as shown in FIG. 13. For example, if the short-preventing wall 191 is not provided between the terminals 41 and 42, the terminals 41 and 42 are simultaneously brought into contact with a conductor such as a metal plate to easily cause a short. The short-preventing wall 191 is longer to the front than the terminals 41 and 42, so that the conductor is brought into contact with one of the terminals and the short-preventing wall 191. Thus, the terminals 41 and 42 are not simultaneously brought into contact with the conductor, which can prevent shorts.

In addition, the guide plate 110 includes terminal-attaching members 192 and 193 arranged to attach the terminals 41 and 42 such as busbars and disposed in front of the supporting portions 112. The guide plate 110 defines a member having several kinds of functions.

Figure 16:
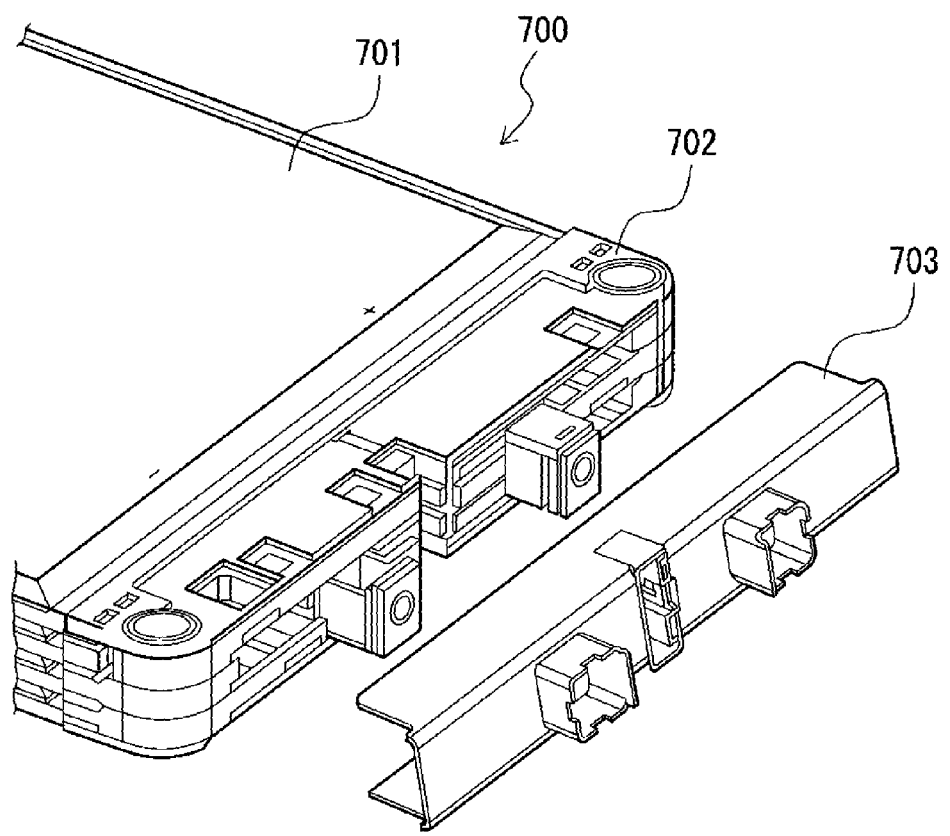
FIG. 16 is an explanatory view showing another example of a conventional battery module.

For example, in a conventional battery module, different members each have the functions of several kinds. For example, FIG. 16 is an explanatory view showing another example of a conventional battery module. A battery module 700 includes laminate type batteries 701, a plate assembly 702 disposed at the end portion thereof, and an insulating cover 703 mounted on the plate assembly 702. The insulating cover 703 has a C-letter shape cross section and is arranged to sandwich the plate assembly 702 vertically. As described above, the insulating cover 703, which is a separate member from the plate assembly 702, is mounted conventionally in order to prevent shorts in terminal. Meanwhile, having the function of preventing shorts, the guide plate 110 of the present invention does not need the insulating cover 703, so that the number of components can be reduced.

When the terminal-attached plates 120 are stacked on the guide plate 110, the guide members 180 and 180a and the guided member 185 limit the movement in the lateral direction of the laminate type batteries 200 and the movement in the longitudinal direction of the laminate type batteries 200. The terminal-attached plates 120 are slidable only in the up/down direction, which defines the plate-stacking direction, while being guided by the guide plate 110.

In the plate assembly 100, the color portions 115 and 125 of the guide plate 110 and the terminal-attached plates 120 are integrated in the plate-stacking direction, and formed into one sleeve 170 (see FIG. 1).

The plate assembly 100 can be fixed in the up/down direction by being pressed by tightening nuts on bolts inserted into the sleeves 170. The movement in the up/down direction, which defines the plate-stacking direction, is limited in the plate assembly 100. The positions of the voltage detecting terminals 140 are limited not only in the horizontal direction as described above, but also in the up/down direction in the plate assembly 100. The color portions 115 and 125 are slightly larger in diameter than the bolts so that the bolts can be easily inserted therein.

Because the sleeves 170 define the color portions 115 and 125 made from metal and bonded in the plate-stacking direction, the sleeves 170, unlike a sleeve made of a resin member, are free from a risk that the sleeves 170 could be crushed by being pressed when tightening nuts on bolts inserted into the sleeves 170. Thus, this configuration improves the positional accuracy of the pin-shaped contact portions 141.

The laminate type batteries 201 to 208 are electrically connected with each other in building the battery module 10 with the use of known means disclosed in Japanese Patent Application Laid-Open Publication No. 2007-172893. For example, the laminate type batteries 201 to 208 are connected in series and built from three sub-assemblies as described below. The three laminate type batteries 206 to 208 are connected in series as the top first assembly, to which the negative output terminal is mounted. The two laminate type batteries 204 to 205 are connected in series as the second assembly. The three laminate type batteries 201 to 203 are connected in series as the bottom third assembly, to which the positive output terminal is mounted. The tab of the first assembly and the tab of the second assembly are connected to each other. The tab of the second assembly and the tab of the third assembly are connected to each other. Thus, the battery module 10 in which the laminate type batteries 201 to 208 are connected in series is obtained.

The advantage of using the pin-shaped contact portions as the contact portions of the terminals is as follows. If blade-shaped terminals are used as the contact portions, the connectors need to include terminals having female contact portions. Meanwhile, when the pin-shaped contact portions 141 are used as the contact portions of the voltage detecting terminals 140, the box terminals 301 can be used as the terminals of the connectors as shown in FIG. 14. When the battery module 10 is connected with the connector connected with the wiring harnesses, the pin-shaped contact portions 141 in the connector fitting portion can be prevented from being tightly fitted into the connector of the box terminals 301, which can reduce the fitting force.

The foregoing description of the preferred embodiment of the present invention has been presented for purposes of illustration and description; however, it is not intended to be exhaustive or to limit the present invention to the precise form disclosed, and modifications and variations are possible as long as they do not deviate from the principles of the present invention.

For example, while described in the above-described embodiment are the eight laminate type batteries that build the battery module, the number of laminate type batteries is not limited specifically. For example, if more laminate type batteries are stacked, more terminal-attached plates should be used accordingly.

While described in the above-described embodiment is the configuration that the plate assembly includes the guide plate and the terminal-attached plates, it is also preferable that the plate assembly has a configuration of only including a plurality of terminal-attached plates.

The invention claimed is:

1. A terminal-attached plate for use in a plate assembly of a battery module, the battery module comprising:
   a single-cell stack comprising thin batteries stacked in a thickness direction, each battery of the single-cell stack comprising thin batteries comprises:
   a thin-plate-shaped battery body comprising an electric power generation element sealed with an exterior package, and
   tabs connected to electrodes of the electric power generation element and drawn to the outside from end portions of the exterior package; and
   a plate assembly connected to an end portion of the single-cell stack,
   the terminal-attached plate comprising:
      a joining portion, with which the terminal-attached plate is arranged to be joined to an end portion of the thin battery;
      a plate supporting portion arranged to support a second plate that is stacked on the terminal-attached plate;
      a terminal comprising:
         a connecting portion, with which the terminal is arranged to be connected to a tab of the thin battery; and
         a contact portion, with which the terminal is arranged to be connected to a connector; and
      a hood member arranged to protect the contact portion of the terminal,
   wherein:
      the hood member is disposed at a position that is offset to an end portion side of the terminal-attached plate from a center in a longitudinal direction of the terminal-attached plate, and
      at least a portion of the hood member of the terminal-attached plate overlaps a hood member of the second plate in a direction orthogonal to a direction of stacking of the terminal-attached plate and the second plate in the plate assembly.

2. The terminal-attached plate according to claim 1, wherein the offset position at which the hood member of the terminal-attached plate is disposed is adjacent to the offset position at which the hood member of the second plate is disposed when the second plate that is turned back relative to the terminal-attached plate, in a width direction of the terminal-attached plate, is stacked on the terminal-attached plate.

3. The terminal-attached plate according to claim 1, further comprising a pair of guide members arranged to guide the terminal-attached plate and the second plate in stacking the terminal-attached plate and the second plate, each of which has an H-letter shape cross section, and which are disposed at positions opposed to each other sandwiching the hood member.

4. A plate assembly for use in a battery module, the battery module comprising:
   a single-cell stack comprising thin batteries stacked in a thickness direction, each battery of the single-cell stack comprising thin batteries comprises:
      a thin-plate-shaped battery body comprising an electric power generation element sealed with an exterior package, and
      tabs connected to electrodes of the electric power generation element and drawn to the outside from end portions of the exterior package; and
   a plate assembly connected to an end portion of the single-cell stack, the plate assembly comprising a plurality of stacked plates, each plate of the plurality of stacked plates comprising:
      a joining portion, with which the plate is arranged to be joined to an end portion of the thin battery;
      a plate supporting portion arranged to support another plate of the plurality of stacked plates that is stacked on the plate;
      a terminal comprising:
         a connecting portion, with which the terminal is arranged to be connected to a tab of the thin battery; and
         a contact portion, with which the terminal is arranged to be connected to a connector; and
      a hood member arranged to protect the contact portion of the terminal,
   wherein:
      the hood member is disposed at a position that is offset to an end portion side of the plate from a center in a longitudinal direction of the plate,
      at least a portion of the hood member overlaps a hood member of another plate in a direction orthogonal to a direction of stacking of the plurality of stacked plates in the plate assembly, and
      the plurality of stacked plates are stacked while the another plate that is turned back relative to the plate in a width direction of the plate, is stacked on the plate.

5. A plate assembly according to claim 4, wherein the offset position at which the hood member of the plate is disposed is adjacent to the offset position at which the hood member of the another plate is disposed when the another plate that is turned back relative to the plate, in a width direction of the plate, is stacked on the plate.

6. The plate assembly according to claim 4, wherein at least one of the plurality of stacked plates comprises a pair of guide members arranged to guide the plurality of stacked plates in stacking the plurality of stacked plates, each of which has an H-letter shape cross section, and which are disposed at positions opposed to each other sandwiching the hood member.

7. A battery module comprising:
   a single-cell stack comprising thin batteries stacked in a thickness direction, each battery of the single-cell stack comprising thin batteries comprises a thin-plate-shaped battery body comprising:
      an electric power generation element sealed with an exterior package, and
      tabs connected to electrodes of the electric power generation element and drawn to the outside from end portions of the exterior package; and
   a plate assembly connected to an end portion of the single-cell stack, the plate assembly comprising a plurality of stacked plates, each plate of the plurality of stacked plates comprising:
      a joining portion, with which the plate is arranged to be joined to an end portion of the thin battery;
      a plate supporting portion arranged to support another plate of the plurality of stacked plates that is stacked on the plate;
      a terminal comprising:
         a connecting portion, with which the terminal is arranged to be connected to a tab of the thin battery; and
         a contact portion, with which the terminal is arranged to be connected to a connector; and
      a hood member arranged to protect the contact portion of the terminal,
   wherein:
      the hood member is disposed at a position that is offset to an end portion side of the plate from a center in a longitudinal direction of the plate, at least a portion of the hood member overlaps a hood member of another plate in a direction orthogonal to a direction of stacking of the plurality of stacked plates in the plate assembly, and the plurality of stacked plates are stacked while the another plate that is turned back relative to the plate, in a width direction of the plate, is stacked on the plate and the plate assembly is disposed at one end portion of single-cell stack.

8. The battery module according to claim 7, wherein the offset position at which the hood member of the plate is disposed is adjacent to the offset position at which the hood member of the another plate is disposed when the another plate that is turned back relative to the plate, in a width direction of the plate, is stacked on the plate in the plate assembly.

9. The battery module according to claim 7, wherein at least one of the plurality of stacked plates comprises a guide plate that comprises a pair of guide members arranged to guide the plurality of stacked plates in stacking the plurality of stacked plates, each of which has an H-letter shape cross section, and which are disposed at positions opposed to each other sandwiching the hood member in the plate assembly.

\* \* \* \* \*